United States Patent
Namekawa et al.

(10) Patent No.: US 8,205,952 B2
(45) Date of Patent: Jun. 26, 2012

(54) SPACER PLACING METHOD

(75) Inventors: Takumi Namekawa, Chigasaki (JP); Kouji Hane, Chigasaki (JP); Masasuke Matsudai, Chigasaki (JP); Yoshio Sunaga, Chigasaki (JP); Junpei Yuyama, Chigasaki (JP); Hidenori Suwa, Chigasaki (JP)

(73) Assignee: Ulvac, Inc., Chigasaki-shi (JP)

( * ) Notice: Subject to any disclaimer, the term of this patent is extended or adjusted under 35 U.S.C. 154(b) by 10 days.

(21) Appl. No.: 12/575,851

(22) Filed: Oct. 8, 2009

(65) Prior Publication Data

US 2010/0066775 A1   Mar. 18, 2010

Related U.S. Application Data

(63) Continuation of application No. PCT/JP2008/056545, filed on Apr. 2, 2008.

(30) Foreign Application Priority Data

Apr. 26, 2007   (JP) ................. 2007-116786

(51) Int. Cl.
*B41J 29/38* (2006.01)
*B41J 2/195* (2006.01)
*B41J 29/393* (2006.01)

(52) U.S. Cl. ............ 347/9; 347/5; 347/6; 347/7; 347/19

(58) Field of Classification Search ............... 347/9, 5–7, 347/19; 358/3.04, 3.19; 349/155; 427/162, 427/58

See application file for complete search history.

(56) References Cited

U.S. PATENT DOCUMENTS 6,819,390 B2 * 11/2004 Washizawa et al. .......... 349/155
7,923,057 B2 *  4/2011 Kurita et al. ................... 427/58

FOREIGN PATENT DOCUMENTS

| JP | 09-254412 | 9/1997 |
| JP | 11-24083 | 1/1999 |
| JP | 2004-109856 A1 | 4/2004 |
| JP | 2006-154627 | 6/2006 |
| JP | 2006-154627 A1 | 6/2006 |
| JP | 2007-025334 | 2/2007 |
| JP | 2007-25334 A1 | 2/2007 |
| JP | 2007025334 A  * | 2/2007 |

OTHER PUBLICATIONS

International Search Report for International Application No. PCT/JP2008/056545 dated Apr. 30, 2008.

* cited by examiner

*Primary Examiner* — Jason Uhlenhake

(74) *Attorney, Agent, or Firm* — Kratz, Quintos & Hanson, LLP

(57) ABSTRACT

A technology for placing spacers free from the occurrence of streaks is provided. Random numbers are generated by a computer, and made in one-by-one association with discharge positions of an object for discharging every generation, and stored in a memory unit of the computer. Coefficient values are determined for the respective discharge positions based on the stored random numbers, and individual voltage values to be required for the respective discharge positions are calculated through the multiplication of voltages set for respective nozzle holes $N_1$ to $N_n$ by the coefficient values. When the respective voltages corresponding to the discharge positions are applied to piezoelectric elements inside a discharge head and a discharge liquid containing the spacers are discharged through the plural nozzles $N_1$ to $N_n$ provided in the discharge head, the spacers are placed on the object for discharging by numbers according to the random numbers.

2 Claims, 3 Drawing Sheets

SPACER PLACING METHOD

The present invention is a Continuation of International Application No. PCT/JP2008/56545 filed Apr. 2, 2008, which claims priority to Japan Patent Document No. 2007-116786, filed on Apr. 26, 2007. The entire disclosures of the prior applications are hereby incorporated by reference herein in their entireties.

BACKGROUND

The present invention generally relates to a spacer placing method.

Recently, inkjet type printers have been used to place spacers for liquid display devices.

Such a printer has a discharge head in which a number of nozzle holes are provided in a row; and when the discharge head and an object for discharging are moved relative to each other, a discharged liquid can be applied onto the positions of a surface of the object for discharging where they are arrayed in a matrix manner.

Spacers discharged through each nozzle hole are arrayed, on a surface of the object for discharging, in a row for each nozzle hole.

Variations in the mechanical precision of the nozzle holes and performances of piezoelectric elements inside the discharge head cause streaks to appear on the substrate on which the spacers are arranged. These problems are disclosed in JPA 2004-109856 and JPA H11-24083.

SUMMARY OF THE INVENTION

The present invention solves the above problem, and is aimed at providing a spacer placing technology free from the occurrence of streaks.

In order to solve the above problem, the present invention is directed to a method for placing spacers, including repeatedly discharging a discharge liquid containing the spacers through a plurality of nozzle holes provided in a discharge head by applying a voltage to piezoelectric elements inside the discharge head, landing the discharge liquid onto a plurality of discharge positions preliminarily set on an object for discharging, and placing the spacers at the discharge positions, wherein coefficient values are set for the respective discharge positions, and the discharge liquids in amounts corresponding to the coefficient values are discharged to the respective discharge positions.

Further, the present invention is directed to the spacer placing method, wherein the coefficient values are determined by random numbers.

Furthermore, the present invention is directed to the spacer placing method, wherein first correction voltage values for the piezoelectric elements are determined for the respective nozzle holes, so as to make an identical volume of the discharge liquid to be discharged through each of the nozzle holes. Second correction voltage values to be applied to the piezoelectric elements are determined for the respective discharge positions from the coefficient values and the first correction voltage values corresponding to the discharge positions.

According to the present invention, no streak is seen on the substrate onto which the spacers are placed.

DETAILED DESCRIPTION OF THE INVENTION

Figure 1:
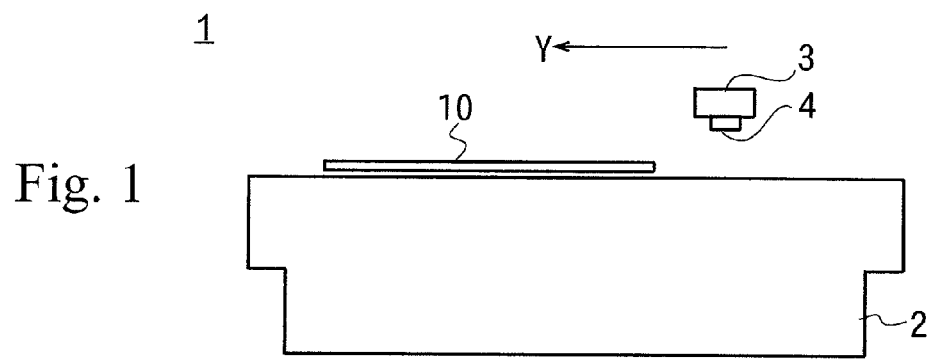
FIG. 1 is a side view for illustrating a discharge apparatus to be used in the present invention.
Figure 2:
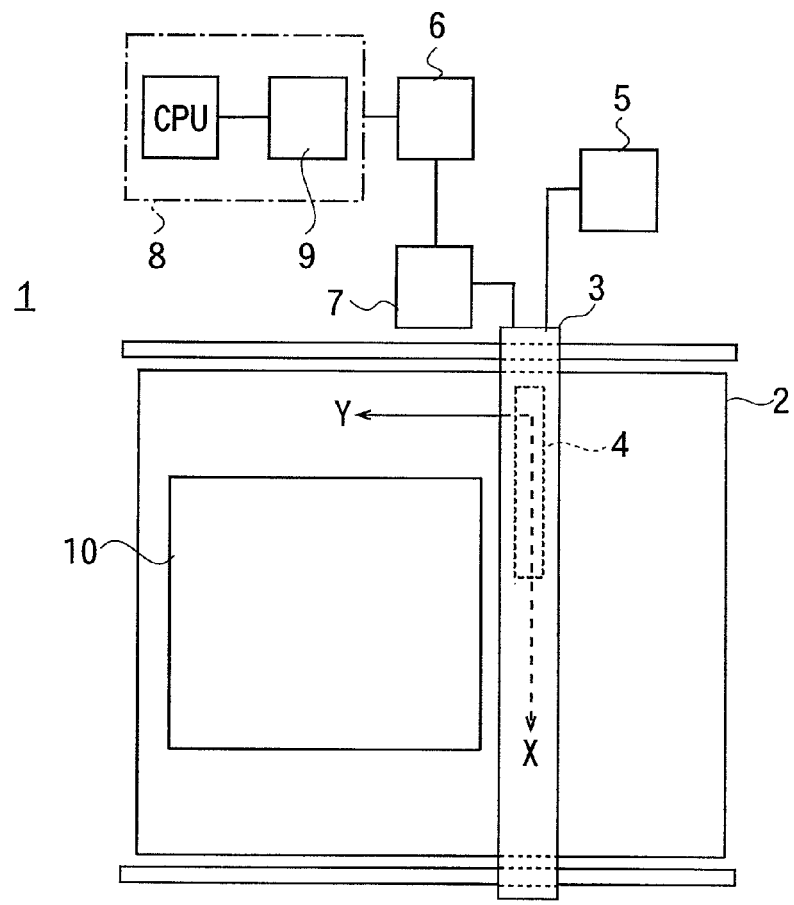
FIG. 2 is a plan view for illustrating the discharge apparatus to be used in the present invention.

FIG. 1 is a side view of a discharge apparatus 1 to be used for the present invention; and FIG. 2 is a plan view thereof.

The discharge apparatus 1 includes a table 2, and a discharge head 4 having plural nozzle holes $N_1$ to $N_n$ is disposed on a shaft 3 arranged above the table 2.

Inside the discharge head 4, a piezoelectric element (not shown) is provided for each of the nozzle holes $N_1$ to $N_n$. The discharge head 4 is connected to a discharge liquid feeding device 5. When a voltage is applied to the piezoelectric element by a control unit 6 while a discharge liquid is being fed from the discharge liquid feeding device 5 to the discharge head 4, a desired amount of the discharge liquid is discharged through each of the nozzle holes $N_1$ to $N_n$. Each of the nozzle holes $N_1$ to $N_n$ is provided with the piezoelectric element; and when the voltage is applied to the piezoelectric element, the discharge liquid is discharged through that one of the nozzle holes $N_1$ to $N_n$ as corresponding to the piezoelectric element. The voltage to be applied to the piezoelectric elements can be varied for the respective piezoelectric elements.

Figure 3:
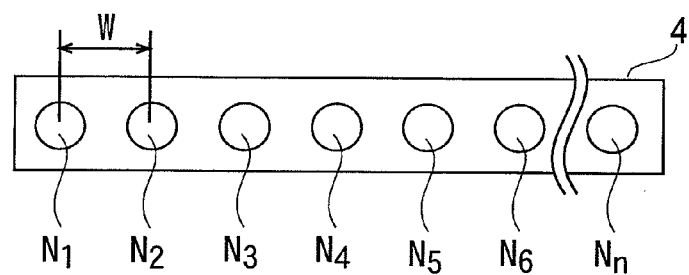
FIG. 3 is a plan view for illustrating nozzle holes provided in a discharge head.

The shaft 3 and the discharge head 4 are connected to a driving unit 7 so that they can move within a horizontal plane vertically to each other. Assuming that the moving direction of the shaft 3 is taken as a Y-axis direction and the moving direction of the discharge head 4 is taken as an X axis direction, the discharge head 4 is rotatable within the horizontal plane. As shown in FIG. 3, the nozzle holes $N_1$ to $N_n$ are provided at a constant interval "w" in a line; and when the line of the nozzle holes $N_1$ to $N_n$ is inclined by an angle θ from a state parallel to the X axis, the interval between the nozzle holes $N_1$ to $N_n$ in the X axis direction is t=w×cos θ. Thus, the interval "t" among the nozzle holes $N_1$ to $N_n$ in the X axis direction can be adjusted.

Figure 4:
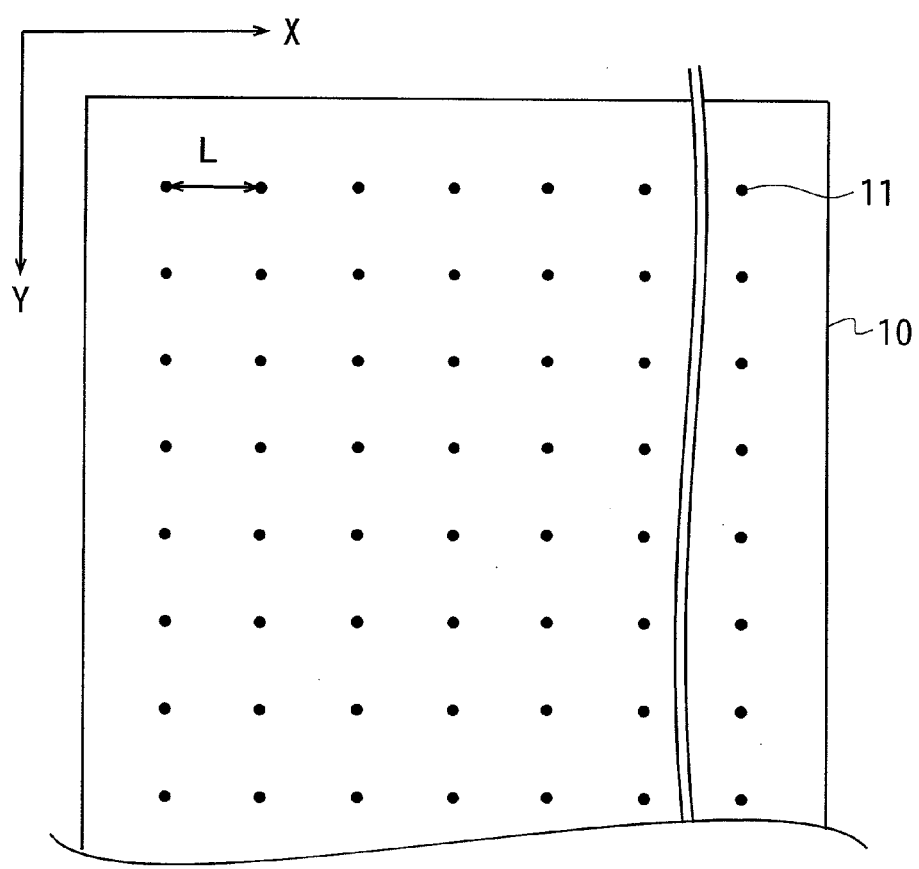
FIG. 4 is a plan view for illustrating a surface of a non-processed object for discharging and inspection.

As shown in FIG. 4, discharge positions 11 for the discharge liquid are set at positions arrayed in a matrix manner on a surface of an object 10 for discharging; and when the angle θ is set such that the interval "L" between the discharge positions 11 in the X axis direction may be in conformity with the interval in the X axis direction: w×cos θ between the nozzle holes $N_1$ to $N_n$, the discharge liquid can be applied on the discharging positions 11 in the matrix manner of the surface of the object 10 for discharging by moving the shaft 3 and the discharge head 4.

A procedure in which the spacers are placed on the surface of the object 10 for discharging by using this discharge apparatus 1 will now be explained.

The discharge head 4 is connected to the control unit 6, and the control unit 6 is connected to a computer 8.

The number of the spacers to be placed on each of the discharge positions 11 is preliminarily stored in a memory unit 9 of the computer 8. First, the above angle θ is determined by the computer, and the discharge head 4 is rotated.

An initial value of the applying voltage to be applied to the piezoelectric elements is preliminarily stored in the computer 8 based on the performance of the piezoelectric elements used and the number of the spacers to be placed; and the discharge liquid is applied in a matrix manner on the surface of the object 10 for discharging and inspection by applying the applying voltage of the initial value in the same magnitude to the piezoelectric element of each of the nozzle holes $N_1$ to $N_n$.

Figure 5:
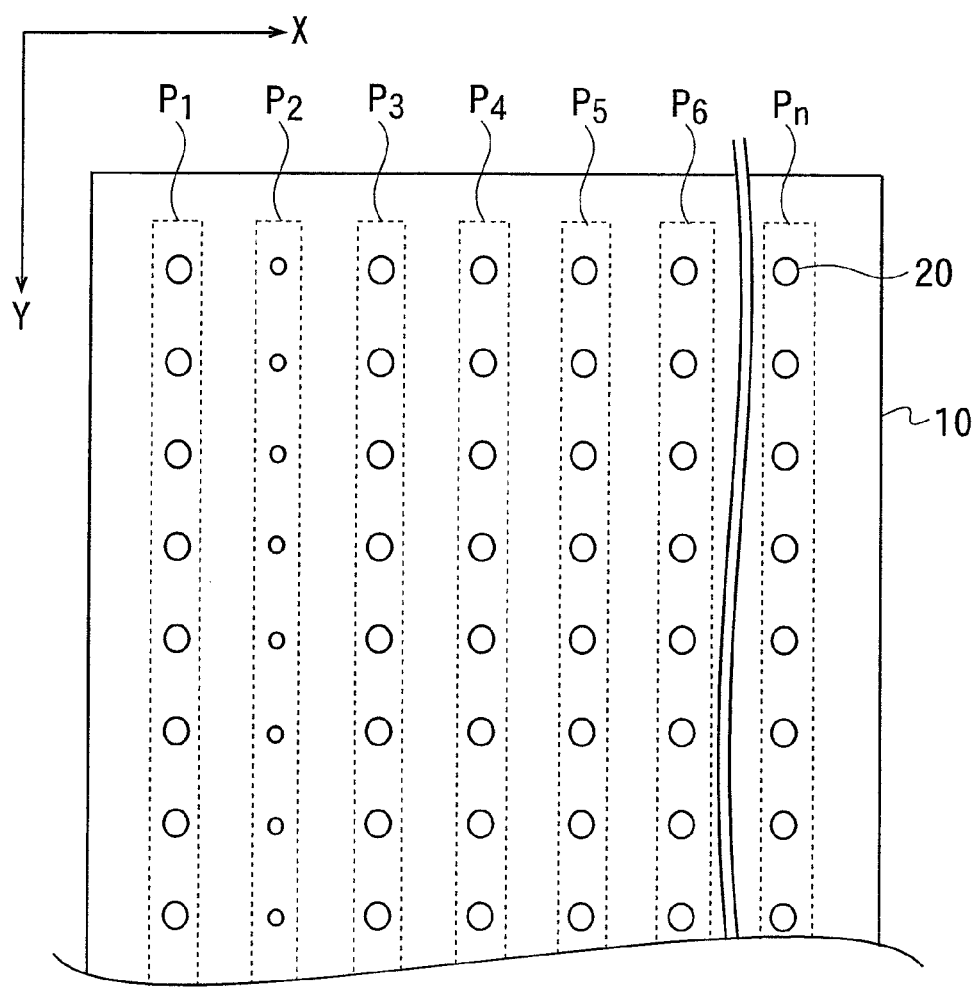
FIG. 5 is a plan view for illustrating a surface of an object for discharging and inspection, in such a state that a streak is formed.

As shown in FIG. 5, the discharge liquids 20 discharged through the respective nozzle holes $N_1$ to $N_n$ and applied on the object for discharging are arrayed in a line parallel to the moving direction of the shaft 3. Since there are variations in the forming precision of the nozzle holes $N_1$ to $N_n$ and the performance of the piezoelectric elements, the number of the spacers in the row P2 applied through the nozzle hole $N_2$ having the performance different from the performance of the other nozzle holes $N_1$ and $N_3$ to $N_n$ largely differs from the number of the spacers in the other rows $P_1$ and $P_3$ to $P_n$, so that the row P2 is observed as a streak.

When the numbers of the spacers in each of the rows $P_1$ to $P_n$ corresponding to the respective nozzle holes $N_1$ to $N_n$ are added up and the average number is determined, the ratio of the average number to the predetermined number of the spacers is determined.

When a constant amount of the discharge liquid is repeatedly discharged, the average value of the numbers of the spacers contained in the discharge liquids is proportional to the amount of the discharge liquid. Since the amount of the discharge liquid is proportional to the voltage applied to the piezoelectric element, a first correction voltage value, which needs to be applied to the piezoelectric element in order to place the predetermined number of the spacers, can be calculated for each of the nozzle holes $N_1$ to $N_n$ based on the ratio of the average number of the spacers placed by actually discharging the discharge liquid to the set number of the spacers.

When the first correction voltage values are stored in the computer 8 in association with the nozzle holes $N_1$ to $N_n$ and the discharge liquid is applied on the discharge positions 11 in the matrix manner by discharging the discharge liquid on the object 10 for discharging and inspection according to the stored first correction voltage values, the average number in each row is almost in conformity with the set value, so that no streak occurs.

However, when the spacers are placed on a number of the objects 10 for discharging, a streak may be temporarily formed due to changes in the performances of the nozzle holes $N_1$ to $N_n$ and the piezoelectric elements, the state of the discharge liquid inside the discharge head 4, etc. Since the streak once formed disappears when the discharge liquid is discharged onto other objects 10 for discharging, the occurrence of streak cannot be prevented by the connection of the voltage values.

The problem may be solved by arranging a non-uniform number of the spacers instead of making the average numbers in conformity because the average number in the row in which the streak is formed slightly differs from the set value. The underlying cause for the occurrence of the streak stems not in the case in which a row having the average number different from the number of the spacers in the other rows is generated but in the case in which a row having the number of the spacers different from the number of the spacers in the other rows is generated in a plane where the discharge positions 11 having the uniform number of the spacers are arranged in the matrix manner.

The discharge positions 11 on the object 10 for discharging are memorized in the memory unit 9 of the computer 8. In addition, a random number generating function is programmed inside the memory unit 9 of the computer 8. Random numbers are generated by this random number generating function, and they are stored as random number coefficients every generation in one-by-one association with the discharge positions 11. For example, numbers are given to the discharge positions 11; and the random numbers are stored in association with the order of the generations.

The random number coefficient is a numerical value which disperses the voltages to be applied to the piezoelectric elements in a range of ±dozens %; and the random number coefficient value is a positive and real number in a range of 1±dozens %.

Second correction voltage values are calculated for the respective discharge positions 11 through the multiplication of the random number coefficients stored in association with the respective discharge positions 11 by the first correction voltage values of the nozzle holes $N_1, N_2, ---, N_{n-1}$ or $N_n$ for the discharge of the discharging liquid to those discharge positions 11, and the second correction voltage values are stored in association with the discharge positions 11.

When the spacers are placed by discharging the discharge liquid onto the respective discharge positions 11 on the object 10 for discharging, those numbers of the spacers correspond to the random numbers are placed on the respective discharge positions 11 by discharging the discharge liquid according to the second correction voltage values stored for the respective discharge positions 11. The numbers are not constant, so that non-uniform numbers of the spacers are placed in the matrix manner.

In this case, even if a row having the average number different from the set value is formed, no streak is seen whatsoever, because non-uniform numbers of the spacers are placed around that row.

Meanwhile, when random numbers are generated, there is a possibility that the random numbers having the same value are continuously generated. When the second correction voltage values are produced based on such random numbers, a streak may be formed. If a streak is seen by first observing a surface on which the spacers are disposed according to the determined second correction voltage values, second correction voltage values are re-determined by generating other random numbers; and the re-determined second correction voltage values are rewritten on the memorized contents, and the spacers are placed again. When no streak is seen, these random number coefficients have only to be adopted.

In the above embodiment, the second correction voltage values are stored. Instead of the voltage values, the number of the spacers or the amounts of the discharge liquid to be placed may be preliminarily stored, and they are converted to voltage values at the time of discharging, in order to apply the voltage to the piezoelectric elements.

Meanwhile, when the upper limit value and the lower limit value are set for the number of the spacers to be placed on the discharge positions 11 in a case of assembling a liquid display device, random number coefficients may be generated such that the second correction voltage values may not deviate beyond the upper limit value and the lower limit value for the number of the spacers.

Furthermore, when the second correction voltage values are to be determined for the respective discharge positions 11 based on the random number coefficients, the first correction voltage values are multiplied by the random number coefficients. Instead of this, the second correction voltage values may be obtained through the multiplication of the initial values of the voltages to be applied by the random number coefficients.

Moreover, the shaft 3 and the discharging head 4 are moved in the above embodiment, but the object 10 for discharging and the discharging head 4 may be moved, while the shaft 3 is kept at a static position.

In addition, if a discharge head 4 longer than the width of the object 10 for discharging is used, the object 10 for discharging may be moved, while the shaft 3 and the discharging head 4 are kept at a static position.

What is claimed is:

1. A method for placing spacers, comprising the steps of:
   repeatedly discharging a discharge liquid containing the spacers through a plurality of nozzle holes provided in a discharge head by applying a voltage to piezoelectric elements inside the discharge head;
   applying the discharge liquid onto a plurality of discharge positions preliminarily set on an object for discharging; and
   placing the spacers at the discharge positions, wherein coefficient values are set for the respective discharge positions, and the discharge liquids in amounts corresponding to the coefficient values, determined by multiplying the voltage by the coefficient values and having an upper and lower limit value, are discharged to the respective discharge positions, and
   the coefficient values are determined by random numbers.

2. A method for placing spacers, comprising the steps of:
   repeatedly discharging a discharge liquid containing the spacers through a plurality of nozzle holes provided in a discharge head by applying a voltage to piezoelectric elements inside the discharge head;
   applying the discharge liquid onto a plurality of discharge positions preliminarily set on an object for discharging; and
   placing the spacers at the discharge positions,
   wherein differing coefficient values are set for the respective discharge positions, and the discharge liquids in amounts corresponding to the differing coefficient values are discharged to the respective discharge positions,
   wherein first correction voltage values for the piezoelectric elements are determined for the respective nozzle holes, so as to make an identical volume of the discharge liquid to be discharged through the respective nozzle holes, and
   wherein second correction voltage values to be applied to the piezoelectric elements are determined for the respective discharge positions by multiplying the first correction voltage values corresponding to the discharge positions by the differing coefficient values and limiting a range of the second correction voltages to have an upper and lower value.

* * * * *